(12) United States Patent
Chu

(10) Patent No.: US 10,746,000 B2
(45) Date of Patent: Aug. 18, 2020

(54) WIDE-INPUT-RANGE DOWNHOLE POWER SUPPLY

(71) Applicant: Halliburton Energy Services, Inc., Houston, TX (US)

(72) Inventor: Jianying Chu, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 61 days.

(21) Appl. No.: 16/066,901

(22) PCT Filed: Feb. 17, 2016

(86) PCT No.: PCT/US2016/018203
§ 371 (c)(1),
(2) Date: Jun. 28, 2018

(87) PCT Pub. No.: WO2017/142521
PCT Pub. Date: Aug. 24, 2017

(65) Prior Publication Data
US 2019/0010788 A1    Jan. 10, 2019

(51) Int. Cl.
*H02M 3/158* (2006.01)
*E21B 41/00* (2006.01)
(Continued)

(52) U.S. Cl.
CPC .......... *E21B 41/0085* (2013.01); *E21B 41/00* (2013.01); *H02M 1/08* (2013.01);
(Continued)

(58) Field of Classification Search
CPC .... H02M 3/156; H02M 3/158; H02M 3/1588; H02M 2001/0009
See application file for complete search history.

(56) References Cited

U.S. PATENT DOCUMENTS 7,432,687 B2   10/2008   Jacobs et al.
7,558,037 B1   7/2009    Gong et al.
(Continued)

FOREIGN PATENT DOCUMENTS

EP   102689   3/1984
EP   509343   10/1992
(Continued)

OTHER PUBLICATIONS

Analog Devices, Inc., "5-Bit Programmable Triple Power Supply Controller for Pentium® III Processors", Available online at:http://www.analog.com, 1999, pp. 1-14.
(Continued)

*Primary Examiner* — Gary L Laxton
(74) *Attorney, Agent, or Firm* — Kilpatrick Townsend & Stockton LLP

(57) ABSTRACT

A power supply can regulate the power from a wide-input power source. The power supply can provide regulated voltage and current and can work in either a constant-current mode or a constant-voltage mode. The power supply includes a switchable charging path and a switchable discharging path, each coupled to the output in series with a current sensor and in parallel with a voltage sensor, wherein the current sensor and voltage sensor provide signals to a control circuit for controlling the switchable charging path and the switchable discharging path. The power supply can rapidly and dynamically switch between a charging state, a freewheeling state, and a discharging state.

18 Claims, 7 Drawing Sheets

(51) Int. Cl.
*H02M 3/156* (2006.01)
*H02M 1/08* (2006.01)
*E21B 34/06* (2006.01)
*H02M 1/00* (2006.01)

(52) U.S. Cl.
CPC .......... *H02M 3/156* (2013.01); *H02M 3/158* (2013.01); *E21B 34/066* (2013.01); *H02M 2001/0009* (2013.01)

(56) References Cited

U.S. PATENT DOCUMENTS

| | | | |
|---|---|---|---|
| 7,652,462 B2 | 1/2010 | Wang et al. | |
| 8,207,721 B2 | 6/2012 | Sohma et al. | |
| 8,278,901 B2 | 10/2012 | Noda et al. | |
| 8,576,589 B2 | 11/2013 | Melanson et al. | |
| 2007/0007935 A1 | 1/2007 | Johnson | |
| 2008/0297122 A1* | 12/2008 | Zhou | H02M 3/156 323/222 |
| 2010/0244801 A1 | 9/2010 | Arora et al. | |
| 2014/0081585 A1 | 3/2014 | Cappucino et al. | |
| 2014/0210441 A1 | 7/2014 | Mao et al. | |
| 2015/0107824 A1* | 4/2015 | Signorelli | E21B 41/0085 166/244.1 |

FOREIGN PATENT DOCUMENTS

| | | |
|---|---|---|
| EP | 1689069 | 8/2006 |
| EP | 1734606 | 12/2006 |
| JP | 2011119637 | 6/2011 |

OTHER PUBLICATIONS

Nikolic et al., "Nonlinear Current Control for Power Electronic Converters: IC Design Aspects and Implementation", IEEE Transactions on Power Electronics, vol. 28, No. 11, Nov. 2013, pp. 4910-4916.
International Patent Application No. PCT/US2016/018203, "International Search Report and Written Opinion", dated Nov. 11, 2016, 13 pages.

* cited by examiner

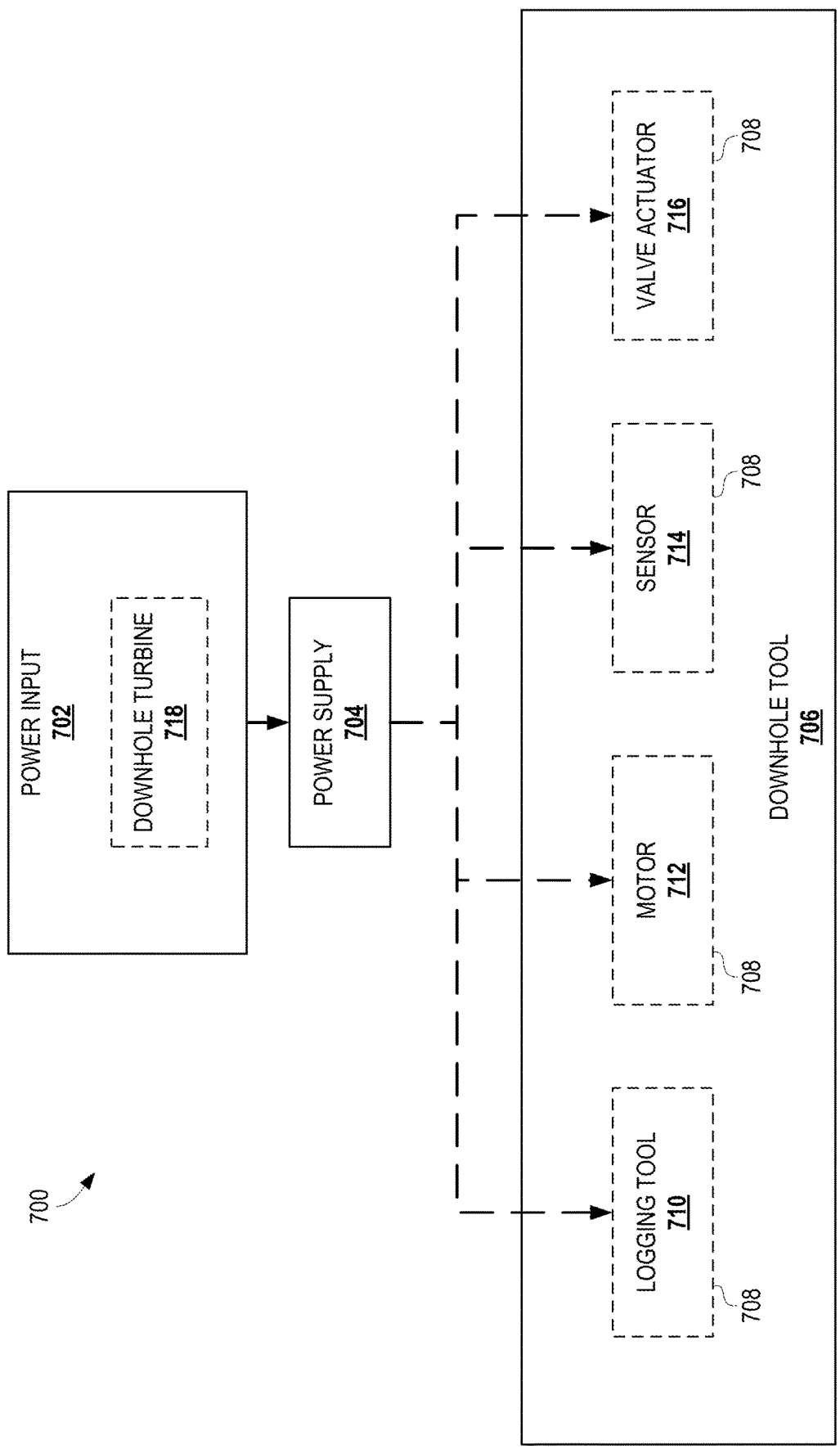

US 10,746,000 B2

WIDE-INPUT-RANGE DOWNHOLE POWER SUPPLY

TECHNICAL FIELD

The present disclosure relates to oilfield operations generally and more specifically to power supplies for use downhole.

BACKGROUND

In oilfield operations, electronics can be used in a downhole environment to perform actions, convey information, and sense data, among other uses. Electronics used downhole are powered by some power source, which can be from the surface, from power stores (e.g., batteries or high-capacity capacitors) located on or near a downhole tool containing the electronics, or from power generation sources (e.g., a generator) located on or near the downhole tool containing the electronics.

Batteries and other power stores can have limited capacity and can be expensive. Additionally, batteries can perform poorly in the high heat and pressure of a downhole environment. Also, it can be complicated and costly to provide power to a downhole tool from the surface. Power outputted by a power generation source, such as a turbine powered by mud flow, can vary widely. For example, a downhole turbine powered by mud flow may provide power anywhere between 100 Volts (V) and 600 V during normal working conditions. Other ranges can occur, including less than 100 V and more than 600 V. Power supplies can regulate the power received from a power source such that the output of a power supply is more predictable. Traditional power supplies, however, are ill-equipped to handle the high fluctuations of power output from downhole power generation sources. Additionally, traditional power supplies are ill-equipped to handle the intense heat and pressure of downhole environments. Traditional power supplies require too much room to be used in many downhole environments, especially given the tight space requirements of many downhole tools.

BRIEF DESCRIPTION OF THE DRAWINGS

The specification makes reference to the following appended figures, in which use of like reference numerals in different figures is intended to illustrate like or analogous components

FIG. 7 is a schematic diagram of a power supply coupled to a downhole tool according to certain aspects of the present disclosure

DETAILED DESCRIPTION

Figure 1:
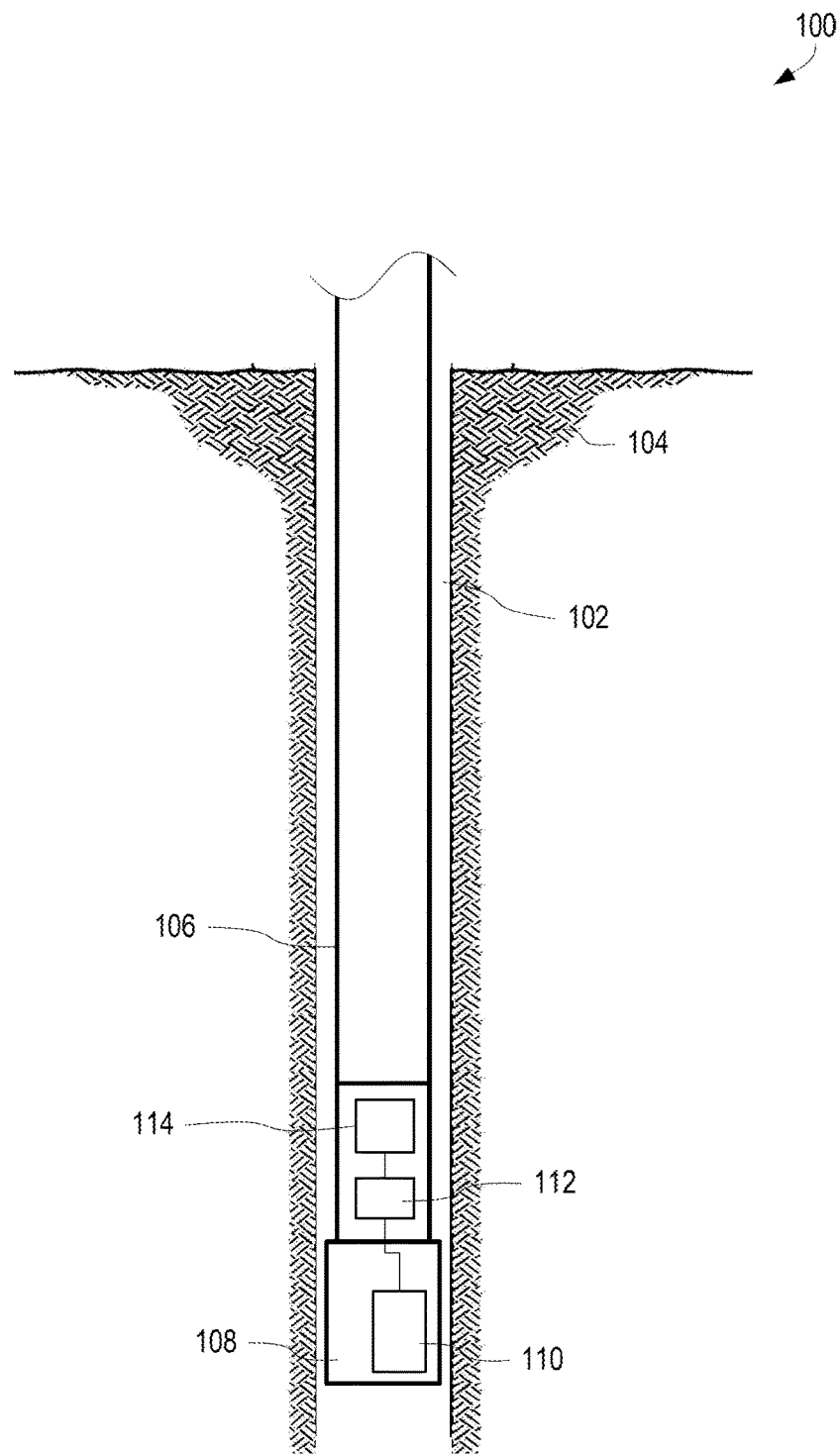
FIG. 1 is a schematic diagram of a wellbore servicing system that includes a tool (e.g., a downhole tool) having a power supply according to certain aspects of the disclosure.

Certain aspects and features of the present disclosure relate to a power supply for regulating the power from a power source. The power source can have a wide input voltage range. The power supply can provide regulated voltage and current and can work in either a constant-current mode or a constant-voltage mode. The power supply includes a switchable charging path and a switchable discharging path that are each coupled to the output in series with a current sensor and in parallel with a voltage sensor. The current sensor and voltage sensor can provide signals to a control circuit for controlling the switchable charging path and the switchable discharging path. The power supply can rapidly and dynamically switch between a charging state, a freewheeling state, and a discharging state.

Turning the switchable charging path on and the switchable discharging path off can enable the current and voltage being passed through the output to rise. Turning the switchable charging path off and the switchable discharging path on can enable the current being passed through the output to drop. The voltage may also drop, but may be held for a short time by a voltage storage element (e.g., a capacitor). Turning the switchable charging path off and the switchable discharging path off can enable any voltage stored in the voltage storage element to drain through the switchable discharging path, thus further lowering the voltage passing through the output. The control circuit can include operational amplifiers (op-amps) that compare signals from the current sensor and the voltage sensor in order to determine when to switch the necessary switchable paths (e.g., the switchable charging path and the switchable discharging path). In some embodiments, the switchable paths can include transistors, such as field-effect transistors (FETs). The control path can include drivers to open or close the FETs.

The current sensor can be a high-speed or ultra-high-speed current sensor capable of detecting cycle-by-cycle currents. The use of cycle-by-cycle current control, rather than a moving-average control, allows the power supply to be responsive, even with volatile input sources or volatile output loads.

A power supply according to some examples can use relatively few components, including components that are easy to source for extreme environments, such as high temperatures (e.g., above 125° C.) and high pressures, and components that are inexpensive. The power supply can regulate power from a power source without the need for pulse-width-modulation (PWM) controllers, analog-to-digital converters (ADCs), or special application-specific integrated circuits (ASICs). The power supply can operate in a constant-current mode or a constant-voltage mode, which can accommodate most power regulation needs. The power supply can automatically switch between constant-voltage mode and constant-current mode. The power supply can switch modes depending on the load applied to the output or other output conditions, such as a short circuit. The power supply can provide cycle-by-cycle current and power sensing and control.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may be drawn not to scale.

FIG. 1 is a schematic diagram of a wellbore servicing system 100 that includes a tool 108 (e.g., a downhole tool) having a power supply 112 according to certain aspects of the disclosure. The wellbore servicing system 100 also includes a wellbore 102 penetrating a subterranean formation 104 for the purpose of recovering hydrocarbons, storing hydrocarbons, disposing of carbon dioxide, or the like. The wellbore 102 can be drilled into the subterranean formation 104 using any suitable drilling technique. While shown as extending vertically from the surface in FIG. 1, in other examples the wellbore 102 can be deviated, horizontal, or curved over at least some portions of the wellbore 102. The wellbore 102 can be cased, open hole, contain tubing, and can include a hole in the ground having a variety of shapes or geometries.

A service rig (not shown), such as a drilling rig, a completion rig, a workover rig, or other mast structure or combination thereof can support the tool 108 in the wellbore 102, but in other examples a different structure can support the tool 108. The tool 108 can be further supported by a conveyance 106, which can be a wireline, slickline, cable, tubular (e.g. drill string, casing string, completion string, coiled tubing or the like), or other structure suitable for supporting the tool 108. In some aspects, a service rig can include a derrick (not shown) with a rig floor through which the conveyance 106 extends downward from the service rig into the wellbore 102. In an offshore situation, the service rig can be supported by piers extending downwards to a seabed in some implementations. Alternatively, the service rig can be supported by columns sitting on hulls or pontoons (or both) that are ballasted below the water surface, which may be referred to as a semi-submersible platform or rig. In an off-shore location, tubing may extend from the service rig to exclude sea water and contain drilling fluid returns. Other mechanical mechanisms that are not shown may control the run-in and withdrawal of the conveyance 106 in the wellbore 102. Examples of these other mechanical mechanisms include a draw works coupled to a hoisting apparatus, a slickline unit or a wireline unit including a winching apparatus, another servicing vehicle, or other such mechanisms. The tool 108 can be located in or part of a sonde, bottom hole assembly, a completion string, or other downhole tool or apparatus.

The tool 108, such as a downhole logging tool, can include an electrical component 110 coupled to a power supply 112. The power supply 112 can accept a wide input range of power from a power source 114 and provide a regulated supply of power to the electrical component 110. Regulated power can include power supplied that is regulated to a particular current or current range and regulated to a particular voltage or voltage range. The power source 114 can be a turbine or other power generator located downhole, such as in or near the tool 108. In some embodiments, the power source 114 can be a stored power source (e.g., a battery). In some embodiments, the power source 114 can be located out of the wellbore 102, such as on the surface. In some embodiments, the power supply 112 can be located in or near the tool 108. In some embodiments, the power supply 112 can be located outside the wellbore 102, such as on the surface.

The power supply 112 can provide a constant current and constant voltage to the electrical component 110 despite variations in the power provided from the power source 114.

Figure 2:
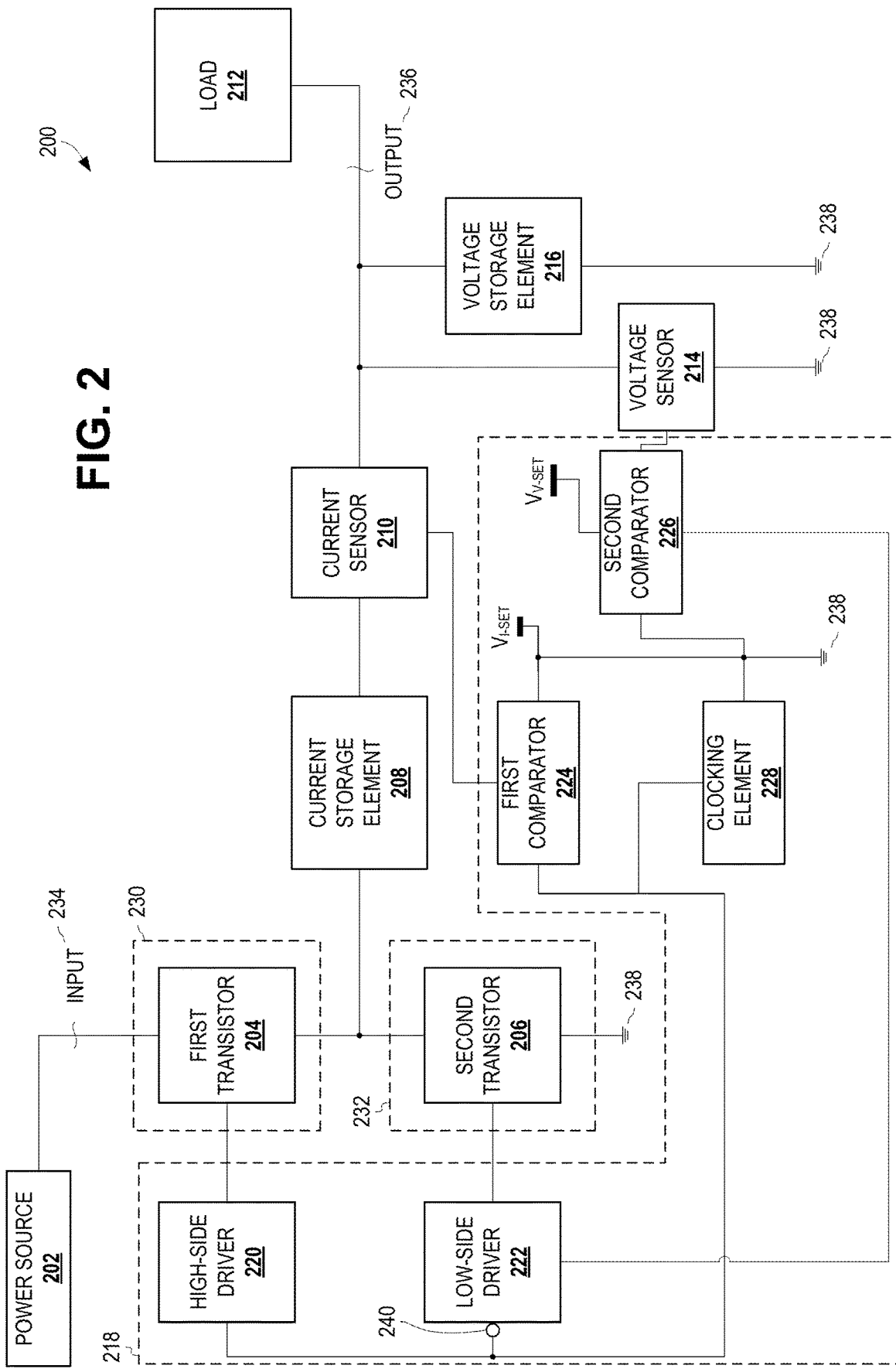
FIG. 2 is a schematic diagram of a power supply according to certain aspects of the present disclosure.

FIG. 2 is a schematic diagram depicting a power supply 200 according to certain aspects of the present disclosure. The power supply 200 can be an example of the power supply 112 of FIG. 1 The power supply 200 can regulate power from a power source 202, through input 234, and can provide the regulated power to a load 212, through output 236. In some embodiments, the load 212 can be the electrical component 110 of the downhole tool 108 of FIG. 1.

Power provided from the input 234 passes through a current storage element 208 and a current sensor 210, and out the output 236. A voltage sensor 214 and a voltage storage element 216 can be placed between the output 236 and ground 238 to measure the voltage being provided through the output 236 and to store voltage, respectively. The current storage element 208 can be an inductor. The voltage storage element 216 can be a capacitor.

The power supply 200 includes switchable paths coupled opposite the current storage element 208 and current sensor 210 from the output 236. The switchable paths include a switchable charging path 230 and a switchable discharging path 232. The switchable charging path 230 switchably couples the power source 202 to the power supply 200, opposite the current storage element 208 and current sensor 210 from the output 236. The switchable discharging path 232 switchably couples the ground 238 to the power supply 200, opposite the current storage element 208 and current sensor 210 from the output 236.

In some embodiments, the switchable charging path 230 includes a switchable element, such as a first transistor 204. In some embodiments, the switchable discharging path 232 includes a switchable element, such as a second transistor 206. The first transistor 204 and the second transistor 206 can each be a FET. Other switchable elements can be used. In some embodiments, the switchable charging path 230 and switchable discharging path 232 can use more or fewer switchable elements to enable discrete control of power through the switchable charging path 230 and the switchable discharging path 232.

To maintain a constant current, a control circuit 218 can alternately switch the switchable charging path 230 and switchable discharging path 232 such that an average current is maintained. Signals indicative of current measurements from the current sensor 210 can be used by the control circuit 218 to alternately enable each of the first transistor 204 and second transistor 206. The control circuit 218 can include a high-side driver 220 for driving the first transistor 204 and a low-side driver 222 for driving the second transistor 206.

A first comparator 224 can compare a signal indicative of the current sensed by the current sensor 210 with a preset value, such as a current-limiting voltage ($V_{I\text{-}SET}$). The current-limiting voltage ($V_{I\text{-}SET}$) can be selected such that a desired current is provided through output 236. When the current sensed is too low (e.g., below a threshold current value), the first comparator 224 can send a signal to enable the high-side driver 220 and disable the low-side driver 222, thus allowing the power source 202 to charge the current storage element 208 and provide additional current to the output 236. This state, when the switchable charging path 230 is closed (e.g., the first transistor 204 is enabled) and the switchable discharging path 232 is open (e.g., the second transistor 206 is disabled) can be a charging state. When the current sensed is too high (e.g., above a threshold current value), the first comparator 224 can send a signal to disable the high-side driver 220 and enable the low-side driver 222, thus allowing the current storage element 208 to discharge through the switchable discharging path 232 and ground 238. This state, when the switchable charging path 230 is open (e.g., the first transistor 204 is disabled) and the switchable discharging path 232 is closed (e.g., the second transistor 206 is enabled) can be a freewheeling state.

In some embodiments, a reversing element 240 located between the low-side driver 222 and the first comparator 224 can ensure that any signal (e.g., enable or disable) sent from the first comparator 224 to both the high-side driver 220 and low-side driver 222 is reversed (e.g., from enable to disable or from disable to enable) before it reaches the low-side driver 222. Thus, any signal from the first comparator 224 to both the high-side driver 220 and the low-side driver 222 can result in one of the high-side driver 220 and low-side driver 222 receiving an "enable" signal and the other receiving a "disable" signal.

The current sensor 210 can be any high-speed or ultra-high-speed current sensor. The current sensor 210 can be capable of measuring current at least at 200 kHz, 1 MHz, 2 MHz, 3 MHz, or faster. Being placed between the output 236 and both the switchable charging path 230 and switchable discharging path 232, the current sensor 210 can measure the current provided from the power source 202. The current sensor 210 is positioned to measure the current in the current storage element 208.

A voltage sensor 214 can be positioned between the output 236 and the ground 238 to sense the voltage being provided to the output 236. The voltage sensor 214 can provide, to the control circuit 218, a voltage signal indicative of the voltage being provided to the output 236. Depending on the voltage signal, the control circuit 218 can simultaneously (e.g., non-alternately) disable both the switchable charging path 230 and the switchable discharging path 232, or allow the switchable charging path 230 and the switchable discharging path 232 to operate as discussed above with reference to the charging state and freewheeling state.

In some embodiments, the control circuit 218 includes a second comparator 226 that receives the voltage signal from the voltage sensor 214 and compares it with a preset value, such as a preset voltage-setting voltage ($V_{V\text{-}SET}$). If the sensed voltage is above the preset voltage-setting voltage ($V_{V\text{-}SET}$), the second comparator 226 can send signals to disable both the first transistor 204 and the second transistor 206, thus causing voltage stored in the voltage storage element 216 to discharge through any load which is connected to the output 236 via the ground 238 as the electric return.

Once the sensed voltage falls the below preset voltage-setting voltage ($V_{V\text{-}SET}$), the second comparator 226 can allow the high-side driver 220 and low-side driver 222 to operate as normal based on current-control, as described above with reference to the first comparator 224.

The second comparator 226 can disable both the first transistor 204 and second transistor 206 by sending signals to the high-side driver 220 (e.g., high-gate driver or h-gate drive) and the low-side driver 222 (e.g., low-gate driver or l-gate drive). The second comparator 226 can provide a signal directly to the low-side driver 222 to disable the second transistor 206. In some embodiments, the second comparator 226 can provide a signal to the first comparator 224 that causes the first comparator 224 to send a signal to disable the first transistor 204. Since the first comparator 224 can simultaneously send a signal to enable the second transistor 206, the signal being sent from the second comparator 226 to disable the second transistor 206 can override the signal being sent from the first comparator 224, so that the second transistor 206 remains disabled.

In some embodiments, the control circuit 218 can include a clocking element 228 for the first comparator 224. The clocking element 228 can be used to limit the duty cycle of the signals being provided to the high-side driver 220, particularly. As an enable signal (e.g., a high voltage, $V_H$) is sent from the first comparator 224, the clocking element 228 can include a delay circuit that sends, after a preset delay, a signal back to the first comparator 224 to cause the first comparator 224 to cease sending the enable signal. The clocking element 228 may be configured so that the clocking element 228 provides clocking control when an enable signal is being sent from the first comparator 224, and not when a disable signal is being sent. In some embodiments, the clocking element 228 is not necessary.

Figure 3:
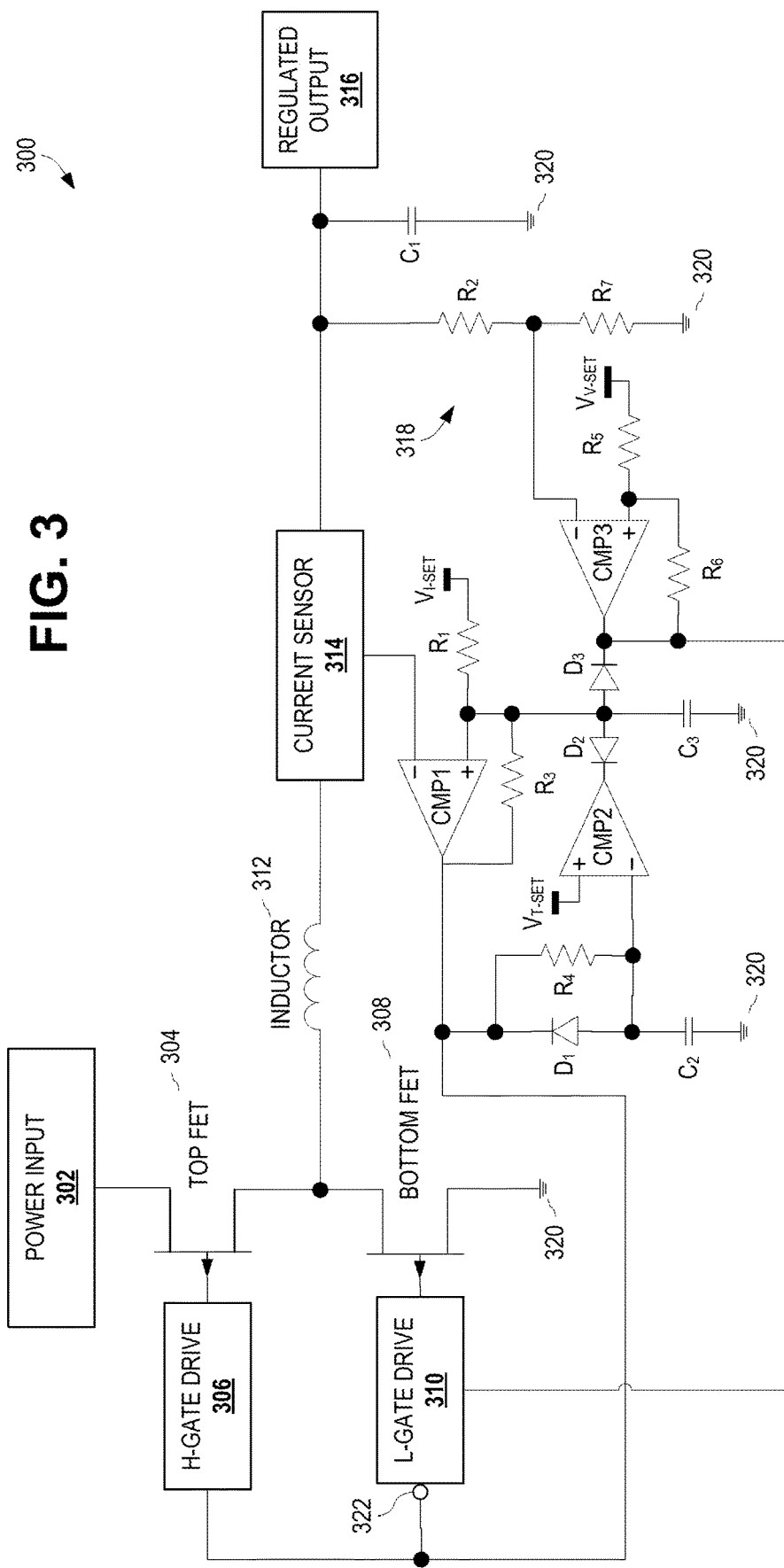
FIG. 3 is a schematic diagram of a specific example of a power supply according to certain aspects of the present disclosure.

FIG. 3 is a schematic diagram of a power supply 300 according to certain aspects of the present disclosure. Power supply 300 can be a specific example of power supply 200 of FIG. 2. The power supply 300 regulates power from a power input 302 and provides the regulated power to a regulated output 316.

Power provided from the power input 302 passes through an inductor 312 and a current sensor 314, and out the regulated output 316. A voltage sensor 318 includes resistor $R_2$ and resistor $R_7$ between the regulated output 316 and ground 320. Capacitor $C_1$ can be a voltage storage element between the regulated output 316 and ground 238.

The power supply 300 includes switchable paths coupled opposite the inductor 312 and current sensor 314 from the regulated output 316. The switchable paths include a switchable charging path having a top FET 304 and a switchable discharging path having a bottom FET 308. The top FET 304 switchably couples the power input 302 to a first end of the inductor 312. The bottom FET 308 switchably couples the ground 320 to the first end of the inductor 312. The second end of the inductor 312 is coupled to the current sensor 314. In some embodiments, the top FET 304 and bottom FET 308 are instead coupled to the inductor 312 through the current sensor 314.

To maintain a constant current, a control circuit can alternately enable the top FET 304 and bottom FET 308. When the top FET 304 is enabled and the bottom FET 308 is disabled, power is able to pass from the power input 302, through the top FET 304, through the inductor 312 (thus storing current), through the current sensor 314, and out the regulated output 316. This state can be a charging state. When the top FET 304 is disabled and the bottom FET 308 is enabled, current stored in the inductor 312 is able to discharge through the ground 320. This state can be a freewheeling state. When the top FET 304 and bottom FET 308 are both disabled, voltage stored in capacitor $C_1$ is able to discharge between the regulated output 316 and the ground 320 through the load, which is connected to the regulated output 316 and not shown in the figure. This state can be a discharging state. To provide constant current, the power supply 300 is able to switch between the charging state and the freewheeling state. In order to provide constant-voltage, the power supply 300 is able switch between the charging state and the discharging state. The power supply 300 can dynamically switch between the charging state, freewheeling state, and discharging state, depending on current sensed by the current sensor 314 and voltage sensed by the voltage sensor 318.

The top FET 304 can be controlled by an H-Gate Drive 306. The bottom FET 308 can be controlled by an L-Gate Drive 310. The current sensor 314 can be any suitable high-speed or ultra-high-speed current sensor, as described herein. The current sensor 314 can pass a voltage signal through the inverting input (e.g., −) of comparator CMP1. A comparison voltage can be set and provided to the non-inverting input (e.g., +) of comparator CMP1 using $V_{I\text{-}SET}$ and resistor $R_1$. Resistor $R_3$ can couple the output of comparator CMP1 with the positive input of comparator CMP1. Resistors $R_1$ and $R_3$, along with the preset voltage $V_{I\text{-}SET}$ can be used to set the range of the output current I provided through the regulated output 316 according to equations 1 and 2, below.

$$I_{min} = \frac{V_L * R_1 + V_{I\text{-}SET} * R_2}{K*(R_1+R_2)} \quad (1)$$

$$I_{max} = \frac{V_H * R_1 + V_{I\text{-}SET} * R_2}{K*(R_1+R_2)} \quad (2)$$

where $V_H$ is the output high of comparator CMP1, $V_L$ is the output low of comparator CMP1, $V_{I\text{-}SET}$ (e.g., voltage for setting the current output) is the pull-up voltage for resistor $R_1$, and where K is a constant determinable from the sensed current $I_{SENSE}$ (e.g., sensed by the current sensor 314) and the sensed voltage $V_{SENSE}$ (e.g., sensed by the voltage sensor 318) based on $V_{sense}=K*I_{sense}$. The average current $I_{avg}$ provided through the regulated output 316 can be determined by equation 3, below.

$$I_{avg} = \frac{(V_L + V_H) * R_1}{2*K*(R_1+R_2)} + \frac{V_{I\text{-}SET} * R_2}{K*(R_1+R_2)} = \frac{I_{min} + I_{max}}{2} \quad (3)$$

In some embodiments, $V_{I\text{-}SET}$ can be the same as the high voltage of comparator CMP1 (e.g., 5 Volts (V)).

When the signal from the current sensor 314, as provided to the inverting input of the comparator CMP1, is lower than the signal provided to the non-inverting input through $V_{I\text{-}SET}$ and $R_1$, the comparator CMP1 can provide a $V_H$ output. The $V_H$ output from the comparator CMP1 can cause the H-gate Drive 306 to activate the top FET 304 and cause the L-gate Drive 310 to deactivate the bottom FET 308. As used herein, activating a FET or a switchable path includes increasing electrical conductivity between two ends of the FET or switchable path (e.g., closing a switch) and deactivating a FET or a switchable path includes decreasing electrical conductivity between two ends of the FET or switchable path (e.g., opening a switch). The L-gate Drive 310 can be caused to deactivate due to the reversing element 322 which can change the $V_H$ signal from the comparator CMP1 to a $V_L$ signal when received by the L-gate Drive 310. When the top FET 304 is activated and the bottom FET 308 is deactivated, the power supply 300 is in a charging state. In the charging state, the power input 302 can provide current, through the top FET 304, to the inductor 312 and the regulated output 316.

When the signal from the current sensor 314, as provided to the inverting input of the comparator CMP1, is higher than the signal provided to the non-inverting input through $V_{I\text{-}SET}$ and $R_1$, the comparator CMP1 can provide a $V_L$ output. The $V_L$ output can cause the H-gate Drive 306 to deactivate the top FET 304 and cause the L-gate Drive 310 to activate the bottom FET 308. The L-gate Drive 310 can be caused to activate due to the reversing element 322, which can change the $V_H$ signal from the comparator CMP1 to a $V_L$ signal when received by the L-gate Drive 310. When the top FET 304 is deactivated and the bottom FET 308 is activated, the power supply 300 is in a freewheeling state. In the freewheeling state, the inductor 312 can discharge its current through the bottom FET 308 and ground 320.

Comparator CMP3, along with resistor $R_5$, resistor $R_6$, and $V_{V\text{-}SET}$ can define the output voltage that is provided through the regulated output 316. The average output voltage $V_{OUT}$ can be determined by equation 4, below.

$$V_{OUT} = \frac{V_{THL} + V_{THH}}{2} \quad (4)$$

Where $V_{THL}$ is the minimum threshold voltage allowed by the power supply 300, as defined by equation 5 below, and $V_{THH}$ is the maximum threshold voltage allowed by the power supply 300, as defined by equation 6 below.

$$V_{THL} = \frac{V_L * R_6 + V_{V\text{-}SET} * R_5}{K*(R_5+R_6)} * \frac{(R_2+R_7)}{R_7} \quad (5)$$

$$V_{THH} = \frac{V_H * R_6 + V_{V\text{-}SET} * R_5}{K*(R_5+R_6)} * \frac{(R_2+R_7)}{R_7} \quad (6)$$

Where $V_{V\text{-}SET}$ (e.g., voltage for setting the voltage output) is the pull-up voltage for resistor $R_5$. In some embodiments, $V_{V\text{-}SET}$ can be the same as the high voltage of comparator CMP3 (e.g., 5 Volts (V)).

When the signal from the voltage sensor 318 (e.g., via resistor $R_2$), as provided to the inverting input of the comparator CMP3, is higher than the signal provided to the non-inverting input through $V_{V\text{-}SET}$ and $R_5$, the comparator CMP3 can provide a $V_L$ output. The $V_L$ output from comparator CMP3 can cause the L-gate Drive 310 to deactivate the bottom FET 308. Additionally, the $V_L$ output from comparator CMP3 can bias the non-inverting input of comparator CMP1, causing comparator CMP1 to provide a $V_L$ output, which can cause the H-gate Drive 306 to deactivate the top FET 304. When the top FET 304 is deactivated and the bottom FET 308 is deactivated, the power supply 300 is in a discharging state. In the discharging state, capacitor $C_1$ can discharge its stored voltage through a load (not shown), which is connected to the regulated output 316 and ground 320. The discharging state corresponds to a sensed voltage $V_{SENSE}$ above a maximum threshold voltage $V_{THH}$.

When the signal from the voltage sensor 318 (e.g., via resistor $R_2$), as provided to the inverting input of the comparator CMP3, is lower than the signal provided to the non-inverting input through $V_{V\text{-}SET}$ and $R_5$, the comparator CMP3 can provide a $V_H$ output. The $V_H$ output from the comparator CMP3 can allow the L-gate Drive 310 to activate the bottom FET 308 whenever comparator CMP1 provides a $V_L$ signal. Additionally, the $V_H$ output from comparator CMP3 may not affect the non-inverting input of comparator CMP1 because of diode $D_3$. When comparator CMP3 outputs a $V_H$ output, the power supply 300 can be operating in either the charging state or the freewheeling state, which corresponds to a sensed voltage $V_{SENSE}$ below a minimum threshold voltage $V_{THL}$.

Comparator CMP2, along with resistor $R_4$, diode $D_1$, capacitor $C_2$, and $V_{T\text{-}SET}$ can define the maximum turn-on time of the top FET 304. Maximum turn-on time of the top FET 304 may be important since many high-side gate drivers are based on the bootstrapping-capacitor drive which must be recharged periodically in order to ensure no conduction loss of the top FET 304. In some embodiments, a high-side gate driver may not need to be clocked (e.g., with a maximum turn-on time), and thus the elements necessary for the clocking of the top FET 304 can removed. The maximum turn-on time $T_{ONMAX}$ can follow equation 7.

$$T_{ONMAX} = R_4 * C_2 * \ln \frac{V_H - V_D}{V_H - V_{T-SET}} \qquad (7)$$

Where $V_{T\text{-}SET}$ (e.g., voltage for setting the maximum turn-on time) is the high voltage of comparator CMP2 (e.g., 5 Volts (V)) and $V_D$ is the forward voltage drop of diode $D_1$.

When a $V_H$ signal is provided by comparator CMP1, capacitor $C_2$ can charge through resistor $R_4$. Once the voltage of capacitor $C_2$ increases to $V_{T\text{-}SET}$, comparator CMP2 can output a $V_L$ signal, which can pull down the potential of comparator CMP1. When the potential of comparator CMP1 is thus pulled down, CMP1 can provide a $V_L$ signal. A $V_L$ signal output from comparator CMP1 can allow capacitor $C_2$ to discharge very quickly through diode $D_1$. Once diode $D_1$ is discharged, comparator CMP2 can revert to outputting a $V_H$ signal. The $V_H$ signal output from comparator CMP2 can allow comparator CMP1's non-inverting output to go back to high. Thus, comparator CMP2 can act as a clocking element to limit the maximum turn-on time of the top FET 304.

In operation, the power supply 300 can begin with comparator CMP1 allowing the top FET 304 to be turned on (e.g., conducting), while the bottom FET 308 is turned off (e.g., not conducting). In this charging state, the current of the inductor 312 can start increasing until it reaches maximum current $I_{max}$. Once the inductor 312 reaches $I_{max}$, the top FET 304 can be switched off and the bottom FET 308 can be switched on, allowing current in the inductor 312 to gradually decrease to keep charging capacitor C1 in the freewheeling state. When the current in the inductor 312 is equal to or less than the minimum current $I_{min}$, the top FET 304 can be switched on again while the bottom FET 308 can be switched off. By alternately switching the top FET 403 and bottom FET 308, the output current can be maintained in the range of $I_{min}$ to $I_{max}$. On average, the output current can be $I_{avg}$.

The output voltage can remain below $V_{THH}$ (e.g., when a light load is coupled to the regulated output 316), which can cause comparator CMP3 to output a high (e.g., a $V_H$ signal) to keep the top FET 304 and bottom FET 308 in alternate conduction, as described above with reference to the charging state and the freewheeling state. However, if the output voltage increases above $V_{THH}$, comparator CMP3 can output a low (e.g., a $V_L$ signal) which can disable the top FET 304 and the bottom FET 308, thus allowing voltage to discharge from the capacitor $C_1$ in the discharging state. Once the output voltage drops below $V_{THL}$, the alternate conduction of the top FET 304 and bottom FET 308 can be re-enabled by comparator CMP3 outputting a high.

Figure 4:
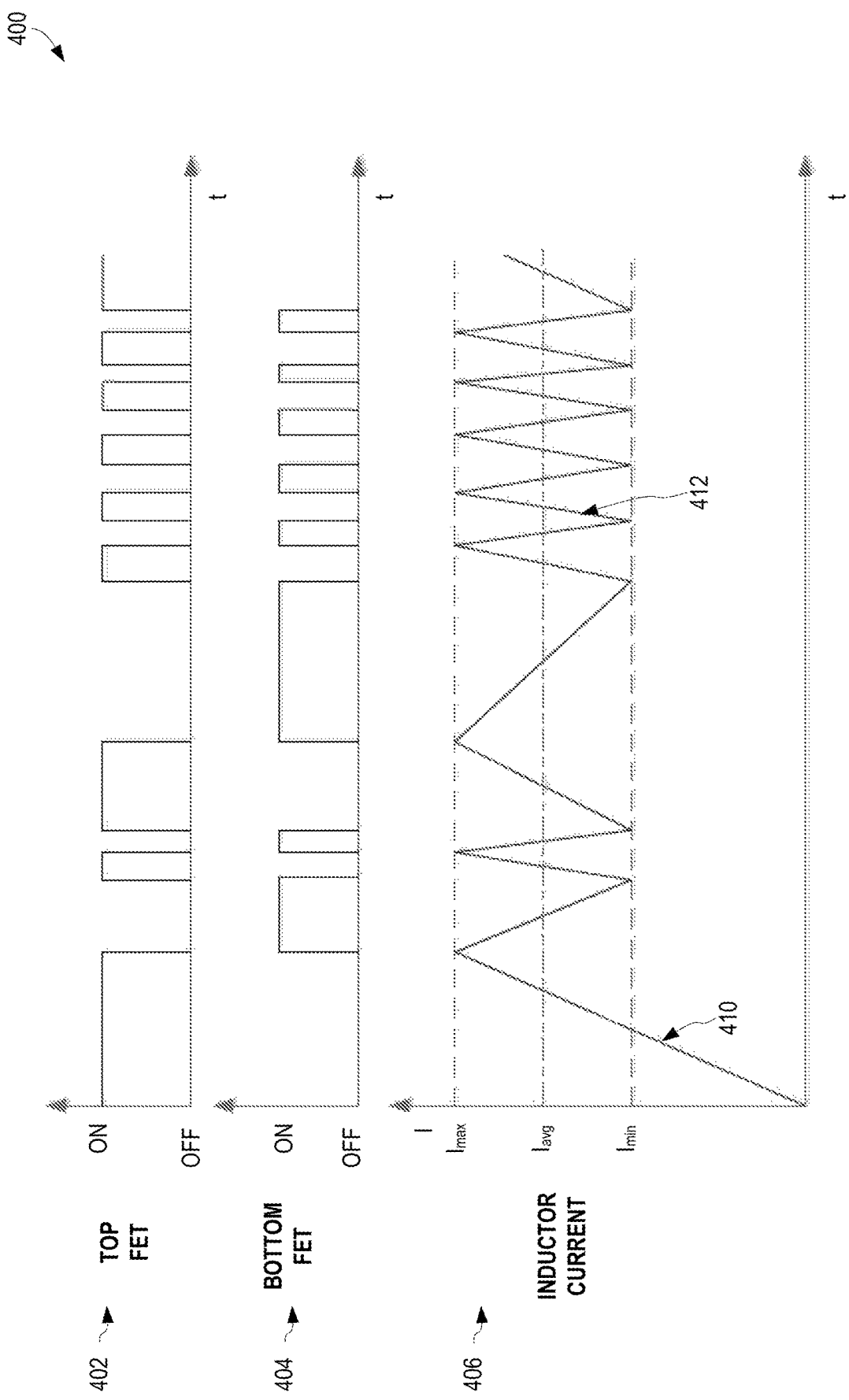
FIG. 4 is a set of graphs depicting the current of inductor and the states of top FET and bottom FET from the power supply of FIG. 3 according to certain aspects of the present disclosure.

FIG. 4 is a set of graphs 400 depicting the current of inductor 312 and the states of top FET 304 and bottom FET 308 from the power supply 300 of FIG. 3 according to certain aspects of the present disclosure. A first graph 402 displays the ON or OFF state of the top FET. A second graph 404 displays the ON or OFF state of the bottom FET. The third graph 406 displays the current of the inductor.

At all times depicted in FIG. 4, the power supply 300 is outputting a voltage under $V_{THH}$, allowing the power supply 300 to operate in either the charging state or the freewheeling state. As seen in graphs 402 and 404, whenever the top FET is in an ON state, the bottom FET can be in an OFF state, which is the charging state. Whenever the top FET is in an OFF state, the bottom FET can be in an ON state, which is the freewheeling state. The charging state can occur whenever the inductor current is increasing towards $I_{max}$. Once the inductor current reaches $I_{max}$, the power supply 300 can go into a freewheeling state, allowing the inductor current to slowly discharge until $I_{min}$ is reached, wherein the power supply can move back into the charging state. This operation can continue repeatedly, allowing the inductor current to be maintained around $I_{avg}$.

As seen in graph 406, the rate at which the inductor current increases can vary depending on the power being supplied from the power source. For example, at point 410, the power source can be providing relatively low power (e.g., around approximately 100 V), whereas at point 412, the power source can be providing relatively high power (e.g., around approximately 600 V). Additionally, the rate of discharge of the inductor can depend on the needs of the load to which the power supply is providing regulated power.

Figure 5:
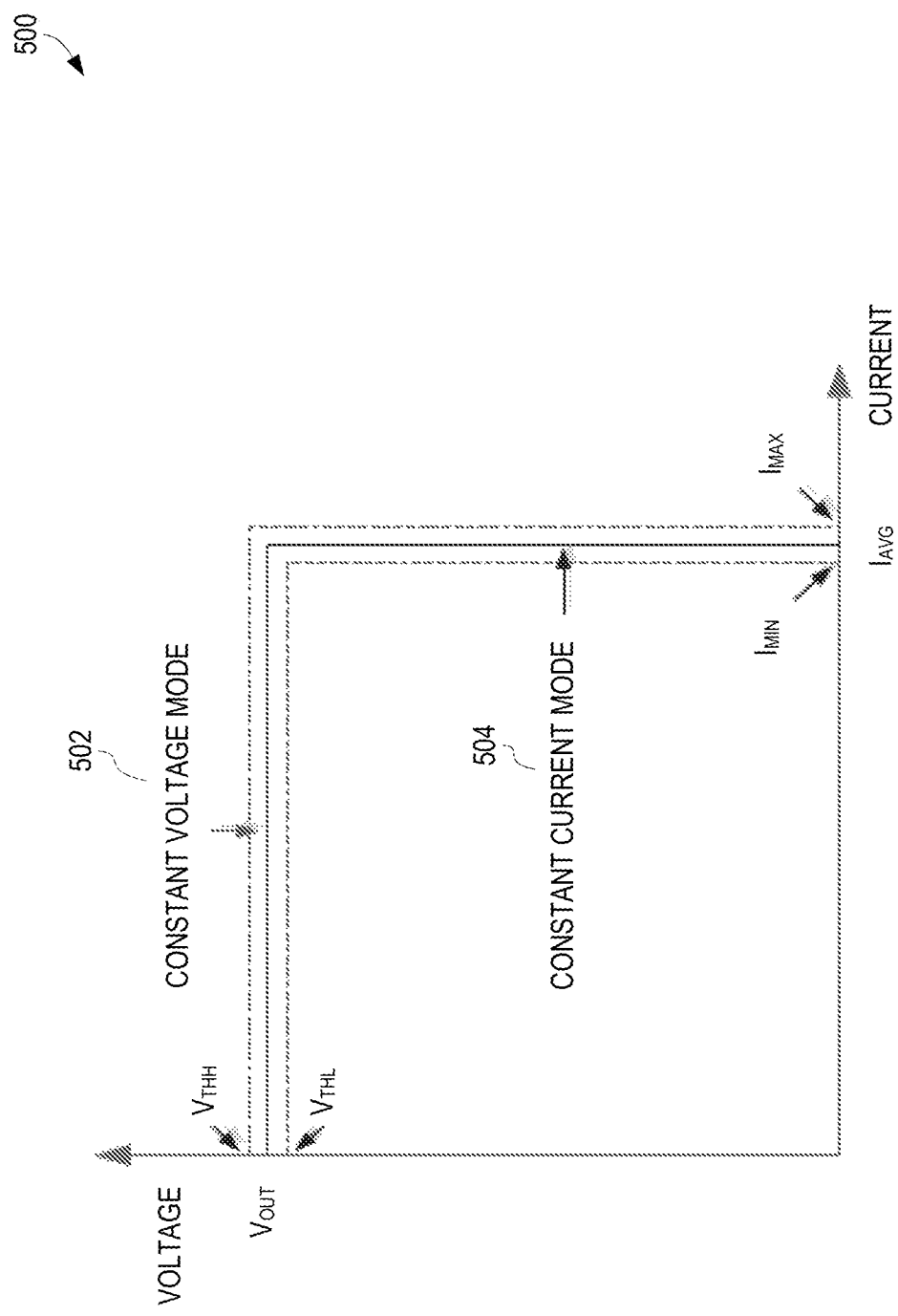
FIG. 5 is a graph depicting the operating modes of the power supply of FIG. 3 according to certain aspects of the present disclosure.

FIG. 5 is a graph 500 depicting the operating modes of the power supply 300 of FIG. 3 according to certain aspects of the present disclosure. The power supply 300 can operate in a constant voltage mode 502 or a constant current mode 504. The graph 500 depicts output voltage on the Y axis and output current on the X axis.

In the constant voltage mode 502, the output voltage can increase until it reaches $V_{THH}$, at which point the power supply can enter the discharging state, allowing the output voltage to decrease until it reaches $V_{THL}$, after which point the power supply can exit the discharging state (e.g., entering either the charging state or the freewheeling state), allowing the output voltage to increase again until it reaches $V_{THH}$.

In the constant current mode 504, the output current can increase until it reaches $I_{max}$, at which point the power supply can enter the freewheeling state, allowing the output current to decrease until it reaches $I_{min}$, after which point the power supply can enter the charging state, allowing the output current to increase again until it reaches $I_{max}$.

The mode of operation of the power supply can depend on the load attached to the power supply, as well as the power being supplied from the power source.

Figure 6:
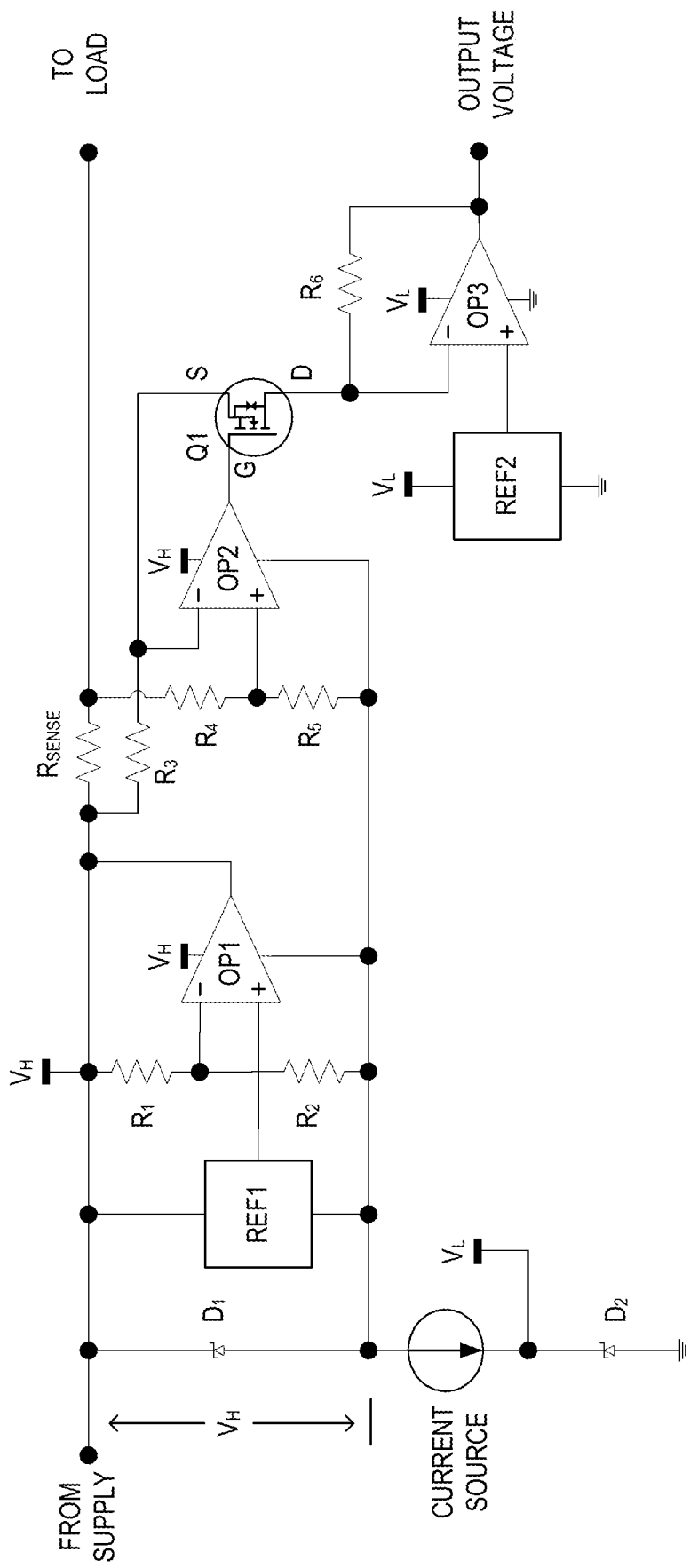
FIG. 6 is a current sensor according to certain aspects of the present disclosure.

FIG. 6 is a schematic diagram depicting a current sensor 600 according to certain aspects of the present disclosure. The current sensor 600 can be capable of high-speed and ultra-high-speed sensing. While a particular current sensor 600 is described with reference to FIG. 6, other current sensors may be suitable for use with various embodiments of the power supplies described herein.

The current sensor 600 can operate by placing a shunt resistor $R_{SENSE}$ in series with the system load in order to generate a voltage proportional to the system load current. The shunt resistor $R_{SENSE}$ can be placed either between the supply voltage and load (high-side sensing), or between the load and ground (low-side sensing). Although a high-side sensing embodiment is depicted in FIG. 6, low-side sensing can be used, especially for applications which do not require common ground sharing between the source and load.

The shunt resistor $R_{SENSE}$ can first be scaled down as the proportional imaged current $I_{IMAGE}$ which passes through resistor $R_3$. The imaged current $I_{IMAGE}$ can be conveyed to low-voltage amplifier OP3 where it can be converted as the voltage output. The voltage output can be a voltage signal indicative of the current passing through the shunt resistor $R_{SENSE}$.

Diode $D_1$, diode $D_2$, the current source, op-amp OP1, resistor $R_1$, and resistor $R_2$ can provide a power supply for op-amp OP2, which can operate in a floating mode. Op-amp OP2 can be referenced to high-side instead of referenced to ground. Diode $D_1$ can be a Zener diode to limit the voltage across reference REF1 and provide regulation of $V_H$. Diode $D_2$ can be a Zener diode for providing a voltage source of $V_L$, which can be used by various components of the current sensor 600, such as reference REF2 and op-amp OP3. The current source can generate float power for various components, such as op-amp OP2, op-amp OP1, and reference REF1.

Reference REF1, resistor $R_1$, resistor $R_2$, and op-amp OP1 can provide secondary regulation of voltage $V_H$. Reference REF1 can provide an accurate output to help regulate $V_H$ to be accurate. In some embodiments, $V_H$ can be maintained to within less than 0.1%, 0.05%, or 0.01% fluctuation.

Op-amp OP2 can sense the voltage difference across $R_{SENSE}$ and the low side of $V_H$. OP2 and transistor $Q_1$ work together to ensure the same voltage potential across its positive and negative terminals, as described by equations 8 and 9.

$$\frac{V_H}{R_5} + \frac{I_{sense} * R_{sense}}{R_4} = I_{IMAGE} * R_3 * \left(\frac{1}{R_4} + \frac{1}{R_5}\right) \quad (8)$$

$$V_H = V_{ref1} * \left(1 + \frac{R_1}{R_2}\right) \quad (9)$$

As current increases, the positive terminal on op-amp OP2 can start to drop, which can lower the output of op-amp OP2, which can lower the gate of transistor $Q_1$, thus increasing the voltage across the gate and source of transistor $Q_1$, and thus lowering the resistance across the source and drain of transistor $Q_1$. Transistor $Q_1$ can be a MOSFET or similar transistor. The, the current of $R_3$ can increase, so the potential can also begin to drop, allowing op-amp OP2 to take action to correct it and lower voltage of $R_3$ to make sure its potential is the same.

Overall, the voltage drop across $R_{SENSE}$ can cause more or less voltage to flow through transistor Q1, which can pass through resistor $R_6$ and out as a voltage output (e.g., signal indicative of sensed current). Transistor $Q_1$ can convey the imaged current $I_{IMAGE}$ from high-voltage potential to the low voltage which can be clamped by op-amp OP3 to the same potential as the output of reference REF2 ($V_{ref2}$). The output voltage can be described with equation 10.

$$V_{out} = V_{ref2} + I_{image} * R_6 = V_{offset} + K * I_{sense} \quad (10)$$

Where $V_{offset} = V_{ref2} - V_{ref1} * \frac{R_2 + R_1}{R_2} * \frac{R_4}{R_4 + R_5} * \frac{R_6}{R_3}$ and where $K = -R_{SENSE} * \frac{R_5}{R_4 + R_5} * \left(\frac{R_6}{R_3}\right)$.

In some embodiments, resistors can be properly selected such that $V_{offset}=0$, thus resulting in $V_{out}=K*I_{sense}$.

FIG. 7 is a schematic diagram of a power supply 704 coupled to a downhole tool 706 according to certain aspects of the present disclosure. The power supply 704 can be a power supply as described herein, such as power supply 112 of FIG. 1, power supply 200 of FIG. 2, or power supply 300 of FIG. 3. The power supply 704 can be coupled to one or more electrical components 706 of the downhole tool 706 to provide regulated power to the electrical component 706. The electrical components 706 are shown in dotted lines to indicate that a single downhole tool 706 may optionally incorporate one or more of the depicted electrical components 706 and that the power supply 704 may optionally provide regulated power to one or more of the depicted electrical components 706. In some cases, a downhole tool 706 may incorporate one or more electrical components other than the types depicted in FIG. 7.

The power supply 704 can receive unregulated, input power from a power input 702. In some cases, the power input 702 can be a downhole turbine 718. In some cases, the power input 702 can be a power generator. In some cases, the power input 702 can be any suitable source of power, such as a source of stored power (e.g., a battery).

In some cases, the downhole tool 706 can include an electrical component 708 that is a logging tool 710. The power supply 704 can supply regulated power to the logging tool 710, which can be any suitable logging tool 710 that can log information about the downhole environment or equipment in the downhole environment. In some cases, the downhole tool 706 can include an electrical component 708 that is a motor 712. The power supply 704 can supply regulated power to the motor 712, which can be any suitable motor, such as a motor for a linear actuator or a motorized tool. In some cases, the downhole tool 706 can include an electrical component 708 that is a sensor 714. The power supply 704 can supply regulated power to the sensor 714, which can be any suitable sensor, such as a magnetic, temperature, electrical, pressure, radio frequency, or other sensor. In some cases, the sensor 714 can be a permanent completion sensor. In some cases, the downhole tool 706 can include an electrical component 708 that is a valve actuator 716. The power supply 704 can supply regulated power to the valve actuator 716, which can be any suitable actuator for manipulating, opening, or closing a valve.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

As used below, any reference to a series of examples is to be understood as a reference to each of those examples disjunctively (e.g., "Examples 1-4" is to be understood as "Examples 1, 2, 3, or 4").

Example 1 is a power supply comprising: a switchable charging path couplable to a power source; a switchable discharging path; an output coupled to the switchable charging path and the switchable discharging path; a current sensor coupled to the output for providing a current signal indicative of current being provided through the output; a voltage sensor coupled to the output for providing a voltage signal indicative of voltage being provided through the output; and a control circuit coupled to the current sensor and the voltage sensor for controlling the switchable charging path and the switchable discharging path in response to receiving the current signal and the voltage signal.

Example 2 is the power supply of example 1, further comprising a current storage element coupled in series with the current sensor and the output; and a voltage storage element coupled in parallel with the voltage sensor and the output.

Example 3 is the power supply of examples 1 or 2, wherein the control circuit comprises a high-side driver for controlling a transistor of the switchable charging path; a low-side driver for controlling a second transistor of the switchable discharging path; a first comparator coupled to the current sensor for controlling the high-side driver and the low-side driver in response to the current signal exceeding either or an upper current limit or a lower current limit; and a second comparator coupled to the voltage sensor for controlling the high-side driver and the low-side driver in response to the voltage signal exceeding an upper voltage limit.

Example 4 is the power supply of example 3, wherein the control circuit further comprises a clocking element coupled to the first comparator for enforcing a maximum turn-on time of the high-side driver.

Example 5 is the power supply of examples 1-4, wherein the current sensor is positioned to measure current between the power source and the output when the switchable charging path is closed.

Example 6 is the power supply of examples 1-5, wherein the output is coupled to an electrical component of a downhole tool, the electrical component selected from the group consisting of a logging tool, a motor, a sensor, and a valve actuator.

Example 7 is a method for regulating power, comprising: charging a current storage element through a switchable charging path, the switchable charging path being activated; sensing a stored current in the current storage element; deactivating the switchable charging path and activating a switchable discharging path in response to the stored current exceeding a maximum current; freewheeling the current storage element through the switchable discharging path; and activating the switchable charging path and deactivating the switchable discharging path in response to the store current falling below a minimum current.

Example 8 is the method of example 7, wherein the switchable charging path includes a first field-effect transistor (FET) and the switchable discharging path includes a second transistor FET, the method further comprising: comparing a signal indicative of the sensed current with a current-setting voltage; and providing a signal to the first FET and the second FET based on comparing the signal indicative of the sensed current with the current-setting voltage.

Example 9 is the method of example 8, wherein activating the switchable charging path includes providing a clocked signal to a high-side driver of the first FET.

Example 10 is the method of examples 7-9, further comprising charging a voltage storage element using the current storage element; sensing a voltage in the voltage storage element; deactivating the switchable charging path and deactivating the switchable discharging path in response to the sensed voltage exceeding a maximum voltage; discharging the voltage storage element; and activating the switchable charging path or the switchable discharging path in response to the sensed voltage falling below a minimum voltage.

Example 11 is the method of example 10, further comprising comparing a signal indicative of the sensed voltage with a voltage-setting voltage; and providing a signal to the first FET and the second FET based on comparing the signal indicative of the sensed voltage with the voltage-setting voltage.

Example 12 is the method of examples 7-11, wherein charging the current storage element includes providing power from a downhole turbine.

Example 13 is the method of examples 7-12, further comprising providing regulated power to an electrical component of a downhole tool from the current storage element, the electrical component selected from the group consisting of a logging tool, a motor, a sensor, and a valve actuator.

Example 14 is an apparatus, comprising: an inductor and a current sensor coupled in series with a load; a power source coupled through a switchable charging path to the inductor; a switchable discharging path coupling the inductor to ground; and a control circuit coupled to the current sensor to alternately activate the switchable charging path and the switchable discharging path.

Example 15 is the apparatus of example 14, further comprising a voltage storage element and a voltage sensor coupled in parallel with the load and the inductor, wherein the control circuit is further coupled to the voltage sensor to deactivate both the switchable charging path and the switchable discharging path based on a sensed voltage.

Example 16 is the apparatus of examples 14 or 15, wherein the power source is a downhole turbine.

Example 17 is the apparatus of examples 14-16, wherein the switchable charging path includes a first field-effect transistor (FET) and the switchable discharging path includes a second FET, and wherein the control circuit includes a high-side driver for driving the first FET and a low-side driver for driving the second FET.

Example 18 is the apparatus of example 17, wherein the control circuit includes a clocking element for enforcing a maximum turn-on time of the high-side driver and the first FET.

Example 19 is the apparatus of examples 14-18, wherein the current sensor is positioned to provide cycle-by-cycle current sensing.

Example 20 is the apparatus of examples 14-19, wherein the current sensor is positioned to measure current between the power source and the load when the switchable charging path is closed.

Example 21 is the apparatus of examples 14-20, wherein the load is an electrical component of a downhole tool, the electrical component selected from the group consisting of a logging tool, a motor, a sensor, and a valve actuator.

What is claimed is:
1. A power supply comprising:
a switchable charging path couplable to a power source;
a switchable discharging path;
an output coupled to the switchable charging path and the switchable discharging path;
a current sensor coupled to the output for providing a current signal indicative of current being provided through the output;
a voltage sensor coupled to the output for providing a voltage signal indicative of voltage being provided through the output;
a voltage storage element coupled in parallel with the voltage sensor and the output; and
a control circuit coupled to the current sensor and the voltage sensor for alternately activating and deactivating the switchable charging path and the switchable discharging path in response to the current signal, and for deactivating both the switchable charging path and the switchable discharging path in response to receiving the voltage signal.

2. The power supply of claim 1, further comprising a current storage element coupled in series with the current sensor and the output.

3. The power supply of claim 1, wherein the control circuit comprises:
a high-side driver for controlling a transistor of the switchable charging path;

a low-side driver for controlling a second transistor of the switchable discharging path;
a first comparator coupled to the current sensor for controlling the high-side driver and the low-side driver in response to the current signal exceeding either or an upper current limit or a lower current limit; and
a second comparator coupled to the voltage sensor for controlling the high-side driver and the low-side driver in response to the voltage signal exceeding an upper voltage limit.

4. The power supply of claim 3, wherein the control circuit further comprises a clocking element coupled to the first comparator for enforcing a maximum turn-on time of the high-side driver.

5. The power supply of claim 1, wherein the current sensor is positioned to measure current between the power source and the output when the switchable charging path is closed.

6. The power supply of claim 1, wherein the output is coupled to an electrical component of a downhole tool, the electrical component selected from the group consisting of a logging tool, a motor, a sensor, and a valve actuator.

7. A method for regulating power, comprising:
charging a current storage element through a switchable charging path, the switchable charging path being activated;
sensing a stored current in the current storage element;
charging a voltage storage element using the current storage element;
sensing a stored voltage in the voltage storage element;
deactivating the switchable charging path and activating a switchable discharging path in response to the stored current exceeding a maximum current;
freewheeling the current storage element through the switchable discharging path;
activating the switchable charging path and deactivating the switchable discharging path in response to the stored current falling below a minimum current;
deactivating the switchable charging path and deactivating the switchable discharging path in response to the stored voltage exceeding a maximum voltage;
discharging the voltage storage element; and
activating the switchable charging path or the switchable discharging path in response to the stored voltage falling below a minimum voltage.

8. The method of claim 7, wherein the switchable charging path includes a first field-effect transistor (FET) and the switchable discharging path includes a second FET, the method further comprising:
comparing a signal indicative of the stored current with a current-setting voltage; and
providing a signal to the first FET and the second FET based on comparing the signal indicative of the stored current with the current-setting voltage.

9. The method of claim 8, wherein activating the switchable charging path includes providing a clocked signal to a high-side driver of the first FET.

10. The method of claim 7, further comprising:
comparing a signal indicative of the stored voltage with a voltage-setting voltage; and
providing a signal to a first field-effect transistor (FET) and a second FET based on comparing the signal indicative of the stored voltage with the voltage-setting voltage.

11. The method of claim 7, wherein charging the current storage element includes providing power from a downhole turbine.

12. The method of claim 7, further comprising providing regulated power to an electrical component of a downhole tool from the current storage element, the electrical component selected from the group consisting of a logging tool, a motor, a sensor, and a valve actuator.

13. An apparatus, comprising:
an inductor and a current sensor coupled in series with a load;
a voltage storage element and a voltage sensor coupled in parallel with the load and the inductor;
a power source coupled through a switchable charging path to the inductor;
a switchable discharging path coupling the inductor to ground; and
a control circuit coupled to the current sensor to alternately activate the switchable charging path and the switchable discharging path, and further coupled to the voltage sensor to deactivate both the switchable charging path and the switchable discharging path based on a sensed voltage.

14. The apparatus of claim 13, wherein the power source is a downhole turbine.

15. The apparatus of claim 13, wherein the switchable charging path includes a first field-effect transistor (FET) and the switchable discharging path includes a second FET, and wherein the control circuit includes a high-side driver for driving the first FET and a low-side driver for driving the second FET.

16. The apparatus of claim 15, wherein the control circuit includes a clocking element for enforcing a maximum turn-on time of the high-side driver and the first FET.

17. The apparatus of claim 13, wherein the current sensor is positioned to measure current between the power source and the load when the switchable charging path is closed.

18. The apparatus of claim 13, wherein the load is an electrical component of a downhole tool, the electrical component selected from the group consisting of a logging tool, a motor, a sensor, and a valve actuator.

* * * * *